Aug. 30, 1938.   O. SCHARPF   2,128,378
CONTROL METHOD AND APPARATUS
Filed Aug. 6, 1936   2 Sheets-Sheet 1
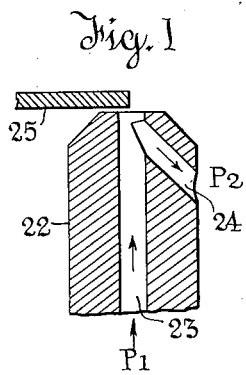
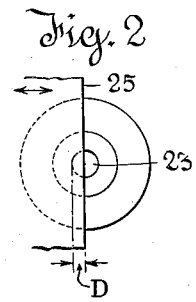
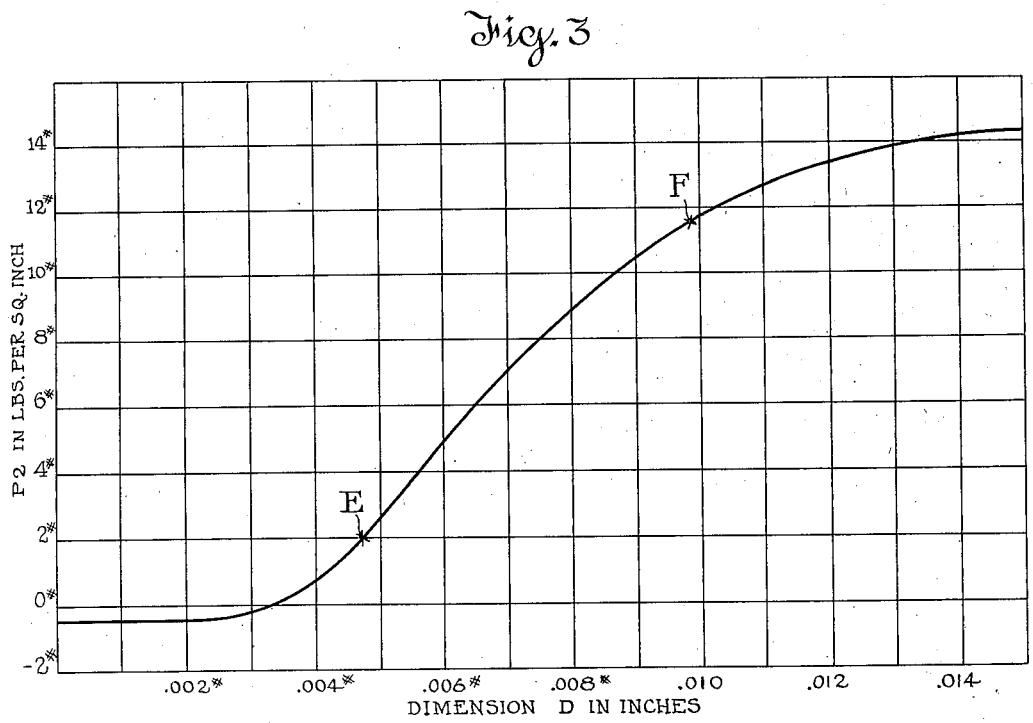
Inventor
Otto Scharpf
By Dodge and Inn.
Attorneys Aug. 30, 1938.　　　　　O. SCHARPF　　　　　2,128,378
CONTROL METHOD AND APPARATUS
Filed Aug. 6, 1936　　　2 Sheets-Sheet 2
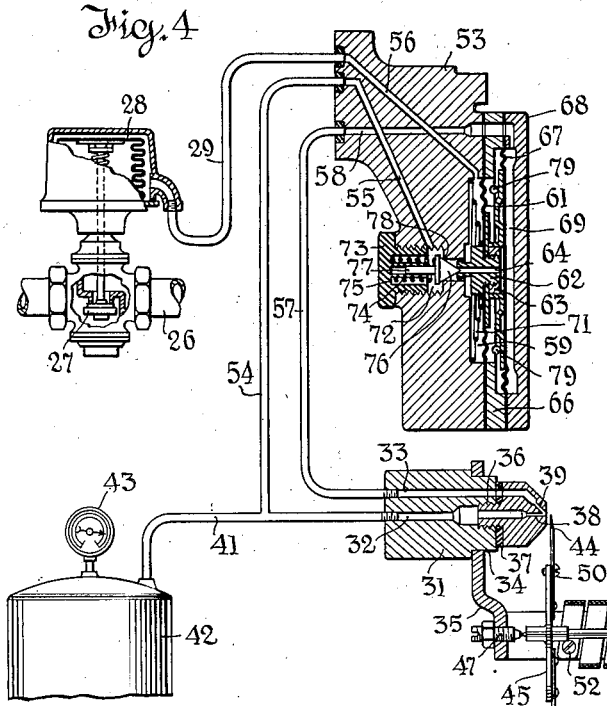
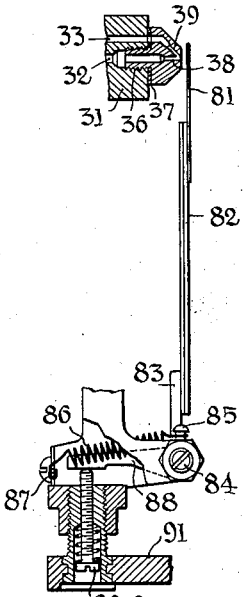
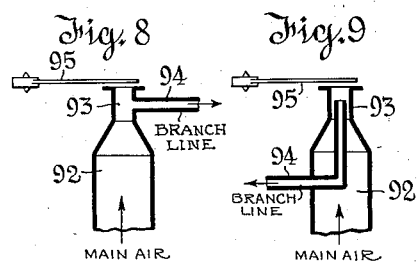
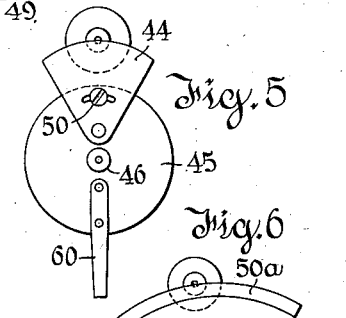
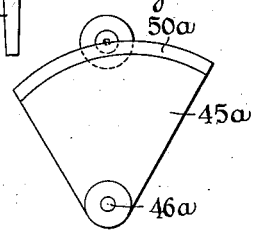
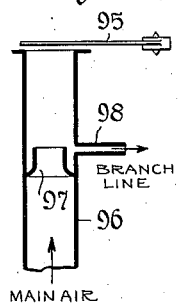
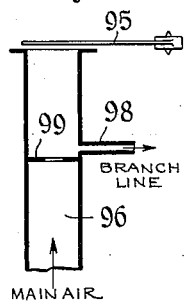
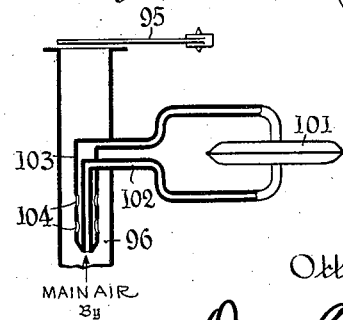
Inventor
Otto Scharpf
By Dodge and Inn
Attorneys Patented Aug. 30, 1938

2,128,378

UNITED STATES PATENT OFFICE 2,128,378

CONTROL METHOD AND APPARATUS

Otto Scharpf, Milwaukee, Wis., assignor to Johnson Service Company, Milwaukee, Wis., a corporation of Wisconsin Application August 6, 1936, Serial No. 94,703

15 Claims. (Cl. 236—82)

This invention relates to a method of control in response to variation in a physical quantity, and is based upon the principle that changes in the rate of flow of a fluid through a restricted orifice produce corresponding changes in the velocity of the flow in such restriction. Although this broad principle is known, it has been discovered, according to this invention, that comparatively slight changes in velocity head will result in unexpectedly large variations in pressure head. Accordingly, it becomes feasible to operate control apparatus in response to minute variations in a physical quantity, and to do so without imposing an appreciable load on the mechanism which responds to the variations.

Numerous objects and advantages will be accomplished by utilizing the principles of this invention. These advantages will be more fully understood when the following specification is read in connection with the accompanying drawings in which:

Figure 1 is a sectional view through a nozzle and vane construction, illustrating one way in which the principle of this invention can be physically embodied.

Fig. 2 is an elevation of diagrammatic character, showing the relation of the parts in Fig. 1.

Fig. 3 is a graph upon which are plotted the pressure variations resulting from altering the relative positions of the parts shown in Figs. 1 and 2.

Fig. 4 is a view partly in section, and partly in elevation, illustrating how apparatus embodying the present invention can be utilized in a known form of temperature controlling system.

Figs. 5 and 6 are elevations showing different types of vane structure which can be utilized in connection with the nozzle shown in Fig. 4.

Fig. 7 is a fragmentary view, partially in section and partially in elevation, showing how a single member associated with the nozzle can function both as a control vane and as a leak-port controlling lid.

Figs. 8–12, inclusive, are diagrammatic views illustrating other ways in which principles of this invention may be embodied for the purposes of control.

Fig. 13 is a further modification in which the principles of the invention are embodied in a system where a pitot-static head replaces the venturi in the fluid stream.

In Fig. 1 of the drawings, the reference character 22 designates a nozzle containing a conduit 23 through which a fluid, such as air under pressure, is flowing in the direction indicated by the arrow. Opening into the main conduit 23, adjacent the restricted end of the nozzle, and in inclined relation to the main conduit, is a branch conduit 24. A movable vane 25 is disposed in front of the outflow end of conduit 23. This vane opposes frictional resistance to the flow of fluid in conduit 23, and slight changes in its position produce very marked changes in the static pressure of the fluid flowing through the branch conduit. Inasmuch as the vane 25 cuts the fluid stream at substantially right angles to its path of movement, it floats in the fluid and imposes an inappreciable load on its support.

For the purpose of illustrating how this vane and nozzle may be utilized, it will be assumed that a fluid such as air under a pressure of fifteen pounds per square inch is supplied to the conduit 23, this pressure being designated $P1$. The pressure of fluid flow in conduit 24 will be designated $P2$, and the dimension D indicated in Fig. 3 measured in inches. If, under these conditions, the change in pressure $P2$ be plotted as a function of the change in dimension D, as the vane 25 occupies various positions, the resultant curve will appear as in Fig. 3. It will be observed that the portion of this curve lying between the points E and F is practically a straight line on which very small changes in the quantity D result in large corresponding changes in pressure $P2$. Although the curve shows that the pressure may fall below zero, for practical purposes, it will be preferred to utilize the straight line portion of the curve. Obviously this curve may be modified considerably, according to the use to which the apparatus is to be put, by varying the shape of the vane 25 and its path of movement with respect to the end of the nozzle 22.

The method of control just described consists essentially in establishing a fluid flow through a conduit in such a way that the sum of the pressure and velocity heads is substantially constant. The velocity head is varied in response to variations of a physical quantity, and the resultant variations in the pressure head are utilized to regulate the physical quantity which varied initially. This principle may be utilized in numerous instruments wherein variations in a physical quantity are caused to vary the response of regulating apparatus. One manner of utilizing this principle is illustrated in Fig. 4 of the drawings, wherein the nozzle and vane structure is embodied in a temperature regulating system.

In Fig. 4, the reference character 26 designates one of the supply lines of a temperature regulating system wherein the flow of a heat exchange medium is to be controlled in accordance with temperature conditions in an enclosed space. A valve 27, placed in the supply line 26, is controlled by a well known type of diaphragm motor 28 adapted to be actuated by air pressure supplied through a pipe 29.

Although it will usually be found desirable to interpose between the nozzle and vane structure a so-called "progressive or intermediate" relay of the general type shown in Patent No. 1,897,857, Feb. 14, 1933, it is to be understood that in some instances a relay of this type may not be necessary, under which conditions control of the diaphragm motor can be exerted directly by the vane and nozzle construction herein disclosed.

The nozzle body is designated 31, and it contains a main conduit 32, a branch conduit 33, and is shouldered at 34 for mounting in a bracket 35. The forward end of conduit 32 is enlarged and threaded to receive the reduced threaded end 36 of the nozzle.

Interposed between the nozzle and the body 31 is a sealing gasket 37 suitably apertured to accommodate the threaded portion 36 of the nozzle. Main conduit 32 is of reduced cross section at 38 adjacent its outflow end, and branch conduit 33 is similarly reduced at 39. These reduced portions 38 and 39 of the conduits are approximations of venturis. A construction such as that shown in Fig. 4 has been found to be sufficiently exact for practical use, although if desired these conduits may be of true Venturi form.

Main line air may be supplied to the main conduit 32 from a pipe 41 connected to a source of compressed air 42. 43 indicates a conventional form of pressure gage. Pivotally disposed in front of, and in controlling relation to the reduced conduits, is an adjustable, movable vane 44 mounted on a pivoted disk 45 carried by shaft 46 mounted in bearings 47 and 48. These bearings are carried by the bracket 35 and are adjustable to vary the clearance between the vane and nozzle and to secure proper frictional relation between the fixed and the movable parts.

Fixedly secured on the shaft 46, at the end adjacent the bearing 48, is an attaching member 49. This member 49 is secured to one end of a coiled, bi-metallic, thermostatic member 51. The opposite end of member 51 is secured to the bracket 35 at 52. This bi-metallic member is responsive to temperature variations and controls the position of the vane 44 in accordance with such variations. The vane 44 may be calibrated with respect to the nozzle by an adjusting screw 50, and the disk 45 may carry an indicating hand or stylus 60 cooperating with a suitable chart or scale (not shown).

In practice the nozzle and vane structure may control the diaphragm motor 28 directly, in which case the pipe 41 supplies air to the conduit 32, and the conduit 33 is connected directly to the line 29. For the purposes of this description, it will be assumed, however, that a relay is interposed between the nozzle and the diaphragm motor, as shown in Fig. 4 of the drawings. This relay comprises a body 53 which is intended to be mounted on the head of the pipe 54 connected to pressure line 41. Pressure fluid is supplied from the pipe 54 to a port 55 in the body 53. The pipe 29, connected to diaphragm motor 28 communicates with a port 56 in the body 53, and pipe 57 connects the branch conduit 33 of the nozzle to a port 58.

Formed in the front face of the body 53 is a recess or chamber 59 having its forward side covered by a diaphragm 61. This diaphragm contains an aperture at the center to receive a fitting 62 which is held by a nut 63 threaded thereon and provided with an axial aperture 64 which opens into the space in front of the diaphragm 61.

The diaphragm 61 is held in place by a metal clamping ring 66 which in turn supports a second diaphragm 67. The diaphragm 67 is of substantially the same construction as the diaphragm 61 except that it is larger, and the ring 66 is shouldered to increase the effective area of the diaphragm 67 relatively to the diaphragm 61. As pointed out in the patent above mentioned, the difference in effective areas of the diaphragms 61 and 67 causes the pressure in chamber 59 to be higher than that in chamber 69, as variation of the pressure in chamber 69 causes variations in chamber 59. Consequently, the effective pressure applied to the diaphragm motor 28 is greater than it would be if diaphragm 61 were of the same effective area as diaphragm 67.

The diaphragm 67 is in turn secured in place by a cover plate 68 having an annular flange on its inner side to form a chamber 69 in front of the diaphragm 67. The diaphragm 67 is in thrust relation with, but is not connected to the fitting 62 carried by the diaphragm 61. A spring 71 in the chamber 59 resists inward motion of the two diaphragms.

The port 55 leads to a chamber 72 formed in the body 53, and into which is threaded from the back of the body, a plug 73. This plug carries a spring 74 mounted in a spring seat 75, and the spring reacts between this seat and the head of a conical valve 76. This valve has a stem 77 moving inside of the spring seat 75. This valve 76 seats at 78 in the passage connecting the chambers 72 and 59, and is axially aligned with the fitting 62 carried by the diaphragm 61. When the diaphragm 61 is forced to the left, the valve 76 first closes the axial port 64 in the fitting 62, and is then forced from its seat 78.

The space between the diaphragms 61 and 67 is vented to atmosphere through ports 79 so that when the diaphragm 61 moves inward (toward the left in Fig. 4), it first closes an exhaust through port 64, and then unseats the valve 76 to admit pressure fluid entering through the port 55. Reverse movement of the diaphragm 61 first seats the valve 76 against 78, to cut off the fluid pressure supply, and then opens the exhaust through the port 64 to the space between the diaphragms.

The port 58 in the body 53 affords direct communication between the branch conduit 33 of the nozzle and the chamber 69 in front of diaphragm 67. In the usual relay structure it has been necessary to provide a needle valve for controlling the flow of fluid from the main line to the space 69, and to provide a leak port control lid for venting that chamber at a rate in excess of any possible rate of supply to it. In the present arrangement, the vane and nozzle construction not only eliminates entirely the use of a needle valve for controlling the supply of fluid to chamber 69, but it eliminates and replaces the leakport control which has been used heretofore for venting that chamber. This not only simplifies the mechanism, but makes it possible to substitute a single means for the two means used heretofore.

The operation of the system illustrated in Fig. 4 is controlled by the thermostatic member 51. As the position of the vane 44 is varied, in response to ambient temperature changes about the member 51, the flow pressure fluid through the conduit 41 is varied, and consequently the static pressure in the conduit 39 is varied. It will be assumed for purposes of this description that valve 27 controls the flow of heating medium.

Inasmuch as very small movements of the vane 44 will result in comparatively large changes in the static pressure in conduit 39, as illustrated in the graph of Fig. 3, the pressure in chamber 69 may be made to vary considerably in response to small temperature changes about the member 51. These pressure variations within the chamber 69 obviously result in increased pressure variations in the chamber 59, and thence in the diaphragm chamber of diaphragm motor 28.

It will be assumed that increases in temperature act on the bi-metallic member 51 to uncover the conduits 38 and 39. This will result in reducing the restriction of the fluid flow from the conduit 38, and hence will decrease the static pressure in the branch conduit 39 to cause a drop in pressure in the chamber 69. The spring in the diaphragm motor 28 will then tend to close the valve 27 and cut off the flow of heating medium, and hence reduce the temperature about the bimetallic member 51. Conversely, a drop in temperature above the member 51 will swing the vane 44 to a position in which it increases the restriction of flow of fluid from the conduits 38 and 39 so as to increase the static pressure in conduit 39, and hence in chamber 69. Increase in pressure in chamber 69, sufficient to overpower the springs 71 and 74, will result in flow of fluid from port 55 through the open valve 76 into the chamber 59, and hence through port 56 and pipe 29 to the diaphragm chamber of diaphragm motor 28. This causes an opening of the valve 27 to increase the flow of heating medium to the line 26, and thus to raise the temperature and restore the parts to the positions which they had before such change occurred.

Although reference has been made to the line 26 as containing a heating medium, it can just as well contain a cooling medium, and the description should be so understood.

Various arrangements of the nozzle and vane may be provided to secure variations in the restriction of the flow of fluid from the nozzle. Although in Figure 5 it has been indicated that the vane 44 is eccentrically mounted on the disk 45, and means are provided for relative adjustment between the two parts, this particular structure is not in any way essential. For example, as shown in Fig. 6, the vane 45a may be supported on a shaft 46a, and the edge of the vane formed eccentrically, as at 50a, to produce the desired graduated control.

Although the system illustrated in Fig. 4 contemplates elimination from the relay of both the pin valve and the leakport control, which are characteristic of the intermediate relay structure shown in Patent No. 1,897,857 referred to, it has been found that similar results may be accomplished in another way, and the thermostat made to act positively, as shown in Fig. 7 of the drawings.

In this figure, the nozzle 31 is constructed as shown in Fig. 4, and has cooperating with it a thin, flexible vane 81. In this instance, however, instead of mounting the vane 81 on an axis parallel to the axis of the nozzle, for rotation about such axis, the vane is secured on one end of a bimetallic thermostatic member 82 attached to arm 83 of a bell crank lever. This lever is secured to an adjustable pivot 84.

As is usual in such constructions, the shaft upon which the bell crank 83 turns, carries a pin 85 to which is attached a spring 86 having its other end secured to a fixed portion of an instrument, as at 87. The bell crank 83 has a second arm 88 bearing against an adjusting screw 89 supported in base 91. The adjusting screw 89 opposes the spring 86 so that contact is maintained between the arm 88 of the bell crank lever and the end of the adjusting screw. The zero position of the vane 81 may be adjusted by moving the adjusting screw 89 up or down until the desired clearance is provided between the vane 81 and the end of the nozzle.

Experiment has developed the fact that when the vane 81 is made of thin, flexible material, it not only forms a restriction which will cause sensitive variations in the static pressure in branch conduit 39, but reaches a critical position with respect to the end of the nozzle where atmospheric pressure overcomes the vacuum in the region of the vane adjacent the end of the nozzle, and causes the vane to snap against the end of the nozzle, closing off both the reduced portions 38 and 39 of the main and branch conduits.

In the arrangement shown in Fig. 7, it is assumed that apart from the mounting of the vane, the remainder of the structure is similar to that shown in Fig. 4. The position of the vane 81 is determined by temperature affecting the bimetallic thermostat 82. So long as temperature conditions are such as to maintain the vane 81 in a position beyond the critical position where it snaps against the end of the nozzle, the flow of fluid from conduit 38 will be varied in accordance with temperature conditions, and corresponding changes will result in the branch line conduit 39. However, when temperature conditions vary so as to cause the vane 81 to move to the left, beyond the critical position, it will snap against the end of the nozzle to entirely cut off the flow of fluid from the conduit 38, and all fluid supplied from that conduit will pass directly to the branch conduit 39.

By proper choice and design of the parts, the apparatus shown in Fig. 7, may be caused to function efficiently as a substitute for the pin or needle valve construction of the patent mentioned above and, at the same time, provide an effective and responsive leak port control means.

The embodiment of the nozzle and vane construction shown in Fig. 4 is at present preferred. However, the broad principle of control illustrated therein may be utilized in numerous ways, some of the more prominent of which have been indicated in Figs. 8–13.

In Fig. 8 the main air supply conduit 92 tapers into a restriction 93. The branch line 94 is connected to this restriction, and the conduit is cut off at the restriction for cooperation with the pivoted vane 95.

In Fig. 9 the static pressure or branch line conduit is arranged inside of the main air conduit so that the latter forms an annular space. In this figure, the main air conduit 92 tapers into a restriction at 93. The branch line conduit 94 is arranged inside of and concentric with the conduit 92. The direction of fluid flow is indicated by the arrows.

In Fig. 10 the branch conduit 94 surrounds the restricted portion 93 of the main conduit 92, and the pivoted vane cooperates with the ends of both of these conduits.

In Fig. 11 the main air conduit 96 is of uniform cross section throughout. Adjacent its midpoint it contains an inserted restriction in the form of a flow nozzle 97, within which the velocity of fluid flow is increased. The branch line 98 is connected to the conduit 96 just at the point where the restricted flow from the nozzle 97 joins the large portion of the conduit leading to the outflow end. The vane 95 operates at the open end of conduit 96.

In Fig. 12, the structure is similar to that shown in Fig. 11, except that an orifice plate 99 is substituted for the flow nozzle 97 of Fig. 11.

So far in this description, it has been assumed that the fluid flow conduits are of the Venturi type, and that the structure is materially simplified in that it requires but a single tap in the throat of the venturi to produce sensitive static pressure variations. It has been found, however, that the principle of this invention may likewise be utilized by the use of an arrangement such as that shown in Fig. 13 of the drawings, wherein a pitot-static head conduit takes the place of the Venturi conduits of the structures previously described.

In Fig. 13 reference character 96 designates the main air conduit as before, having at its outflow end the usual pivoted vane 95. Disposed within and facing the flow of air indicated by the arrow in the main conduit is a pitot-static head arrangement designed to produce differential pressure variations on a diaphragm 101 arranged to control suitable indicating or regulating mechanism. As is usual in arrangements of this sort, the inside conduit 102 records the dynamic pressure which bears against the lower surface of diaphragm 101. The outer conduit 103 contains the usual perforations 104 arranged so that static pressure variations act upon the upper surface of the diaphragm 101 in opposition to the dynamic pressure variations beneath that diaphragm. With this arrangement, movements of the vane 95 will vary the restriction to the flow of fluid through the conduit 96, and these variations will cause changes in both the dynamic and the static heads acting on the diaphragm 101. However, according to the principles set forth hereinbefore, changes in position of the vane 95 cause substantial variations in the static pressure and considerably smaller changes in the dynamic pressure. Consequently, with this arrangement slight movement of the vane 95 can be caused to produce substantial variations in the control mechanism associated with the diaphragm 101.

Use of apparatus embodying the principles above set forth will result in a smooth and progressive control in response to variations in any physical quantity requiring such controlling apparatus. The freely floating vane puts no lag on the recording or indicating mechanism, whereas the response of the mechanism to slight changes in the position of the vane is prompt and reliable. These results may be obtained with each and all forms of the apparatus above described.

Although the restrictions in the main flow conduit have been indicated in the drawings somewhat roughly, and as only approximating a true venturi, it is to be understood that the use of a true venturi is also contemplated, and is within the scope of this invention.

What is claimed is:

1. The combination with a main conduit having a restriction therein and terminating in an open end beyond said restriction, of a branch conduit communicating with said main conduit in close proximity to the open end thereof; a source of fluid supply for said main conduit; and a thin vane movable in a plane substantially at right angles to the axis of said main conduit and in spaced relation to the open end of said main conduit.

2. The combination with a discharge nozzle having an open end and a closed end, of a source of pressure fluid connected to said closed end; a main conduit in said nozzle, said conduit containing a restriction; a branch conduit connected to said main conduit between said restriction and the open end of said nozzle; a pivoted vane disposed in front of the open end of said nozzle, and movable in a plane perpendicular to the axis of the main conduit for varying the velocity head of fluid discharged from said main conduit; and means for varying the position of said vane to vary the pressure head in said branch conduit.

3. The combination with a source of pressure fluid, of a first conduit connected to said source and having an open end; a second conduit connected to said first conduit between said source and said open end and adapted for connection to the controlled element; a pivoted vane mounted for movement in a path at right angles to the axis of said first conduit but spaced from said open end; and temperature responsive means for moving said vane to vary the pressure head in said second conduit.

4. The combination of a nozzle adapted to convert pressure head into velocity head; means for supplying fluid to said nozzle under a substantially uniform initial pressure head; means for variably throttling the flow through said nozzle, said means comprising a thin vane spaced from said nozzle and movable in a path substantially at right angles to the path of fluid flow from said nozzle; an element responsive to a variable physical quantity for actuating the last-named means; and a controller for said variable physical quantity responsive to the pressure head in said nozzle.

5. The combination of a nozzle adapted to convert pressure head into velocity head; means for supplying fluid to said nozzle under a substantially uniform initial pressure head; means for variably throttling the flow through said nozzle, said means comprising a thin, flexible vane movable toward and away from said nozzle and adapted to engage the end of said nozzle to completely cut off flow therefrom; an element responsive to a variable physical quantity for actuating said last-named means; and a controller for said variable physical quantity responsive to the pressure head in said nozzle.

6. In an automatic controlling system, a source of pressure fluid; a controlled device; a pressure relay interposed between said source and said device, said relay having a controlled chamber and a controlling chamber so related that pressure variations in the controlling chamber produce related variations in the controlled chamber; a nozzle having a main passage connected to said source, and a branch passage connected to said controlling chamber and to said main passage adjacent the open end of the nozzle; a thin vane movable across the path of fluid flow from said nozzle to vary the flow of fluid in said main passage to control the pressure in said branch passage; and means responsive to variations in a physical quantity for actuating said vane.

7. In an automatic controlling system, a source of pressure fluid; a controlled device; a pressure relay interposed between said source and said device, said relay having a controlled chamber and a controlling chamber so related that pressure variations in the controlling chamber produce related variations in the controlled chamber; a nozzle having a flow passage connected to said source, and a branch passage connected to said controlling chamber; a thin, flexible vane disposed adjacent the end of said nozzle and movable toward and away from said nozzle to vary the flow of fluid from said main passage to control the pressure in the branch passage; and means responsive to an atmospheric condition to actuate said vane.

8. In an automatic controlling system, a source of pressure fluid; a controlled device; a pressure relay interposed between said source and said device, said relay having a controlled chamber and a controlling chamber so related that pressure variations in the controlling chamber produce related variations in the controlled chamber; a nozzle having a flow passage connected to said source, and a branch passage connected to said controlling chamber; a thin, flexible vane disposed adjacent the end of said nozzle and movable toward and away from said nozzle to vary the flow of fluid from said main passage to control the pressure in the branch passage, said vane also being capable of movement into contact with the end of said nozzle to entirely cut off the flow therefrom; and means responsive to variations in a physical quantity for actuating said vane.

9. In an automatic controlling system, a source of pressure fluid; a controlled device; a nozzle having a main passage connected to said source, and a branch passage connecting said main passage with said device, said branch passage opening into said main passage adjacent the open end of the nozzle; and a flat vane movable across the path of fluid flow from said nozzle to control the pressure in said branch passage.

10. In a controlling system, a source of pressure fluid; a controlled device; a nozzle having a main passage connected to said source, and a branch passage connecting said main passage with said device, said branch passage opening into said main passage adjacent the open end of the nozzle; and a thin, flexible vane movable toward and away from said nozzle or into contact with the same to vary the fluid flow therefrom or to obstruct such flow entirely.

11. In an automatic controlling system, a source of pressure fluid; a controlled device; a nozzle having a main passage connected to said source, and a branch passage connecting said main passage with said device; a thin, flexible vane movable toward and away from said nozzle or into contact with the same to vary the fluid flow therefrom or to obstruct such flow entirely; a support for said vane, said support having its axis transverse to plane of movement of said vane; means for biasing said vane to a predetermined critical position with respect to said nozzle; and means responsive to an atmospheric condition for moving said vane away from said nozzle in opposition to said biasing means.

12. In an automatic controlling system, a source of pressure fluid; a controlled device; a nozzle having a main passage connected to said source and terminating in an open end; a branch passage connecting said main passage adjacent said open end with said device; a pivoted member; a vane adjustably mounted on said member and movable in a plane intersecting the path of fluid flow from said nozzle; and temperature responsive means for actuating said member and vane to cause pressure variations in said branch passage.

13. In an automatic controlling system, a source of pressure fluid; a controlled device; a nozzle having a main passage connected to said source and terminating in an open end; a branch passage connected said main passage with said device within said open end; and a vane movable eccentrically with respect to said main passage and at right angles to its axis for varying the fluid flow in said main passage to control the pressure in said branch passage.

14. A controlling system comprising a nozzle having a closed and an open end and two conduits joined adjacent the open end; a source of pressure fluid connected to one of said conduits at the closed end of the nozzle; a pivoted vane movable with respect to the path of fluid flow from the open end of said nozzle to vary the velocity head of said fluid; controlling means for actuating said vane; and controlled means connected to the other conduit and responsive to changes in pressure head occurring therein as said vane is moved.

15. A controlling system comprising a nozzle having a main fluid conduit extending therethrough, and a branch conduit connected to said main conduit adjacent the open end thereof; means for supplying fluid to said main conduit to cause a continuous flow of fluid from said nozzle; a thin vane movable in a plane at right angles to the axis of said main conduit in freely floating relation to the fluid stream to vary the velocity head in said main conduit; means responsive to variations in a physical quantity for actuating said vane; and means responsive to pressure head variations in said branch conduit for controlling said physical quantity.

OTTO SCHARPF.

CERTIFICATE OF CORRECTION.

Patent No. 2,128,378. August 30, 1938.

OTTO SCHARPF.

It is hereby certified that error appears in the printed specification of the above numbered patent requiring correction as follows: Page 5, second column, line 26, claim 13, for the word "connected" read connecting; and that the said Letters Patent should be read with this correction therein that the same may conform to the record of the case in the Patent Office.

Signed and sealed this 4th day of October, A. D. 1938.

Henry Van Arsdale (Seal) Acting Commissioner of Patents.